United States Patent
Seada et al.

(10) Patent No.: US 7,386,723 B2
(45) Date of Patent: Jun. 10, 2008

(54) METHOD, APPARATUS AND SYSTEM FOR COMPRESSING IPSEC-PROTECTED IP PACKETS

(75) Inventors: Karim Seada, Los Angeles, CA (US); Hani ElGebaly, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 628 days.

(21) Appl. No.: 10/302,351

(22) Filed: Nov. 22, 2002

(65) Prior Publication Data

US 2004/0103277 A1 May 27, 2004

(51) Int. Cl.
*H04L 9/00* (2006.01)

(52) U.S. Cl. .................. 713/160; 455/72

(58) Field of Classification Search ............... 713/160, 713/150, 153, 162; 455/72; 380/247
See application file for complete search history.

(56) References Cited

U.S. PATENT DOCUMENTS

| 6,909,702 B2* | 6/2005 | Leung et al. | 370/278 |
| 7,031,666 B2* | 4/2006 | Hsu | 455/72 |

* cited by examiner

*Primary Examiner*—Kambiz Zand
*Assistant Examiner*—Ellen Tran
(74) *Attorney, Agent, or Firm*—Sharmini N. Green (57) ABSTRACT

A robust header compression scheme ("ROHC") compresses IP security ("IPSec") protected IP packets. More specifically, ROHC is applied to portions of an IP packet header prior to IPSec encryption. ROHC may then optionally be applied again to the unencrypted portions of the IP packet.

22 Claims, 5 Drawing Sheets

METHOD, APPARATUS AND SYSTEM FOR COMPRESSING IPSEC-PROTECTED IP PACKETS

FIELD OF THE INVENTION

The present invention relates to the field of networking communications, and, more particularly to a technique for applying robust header compression to encrypted Internet Protocol ("IP") packets.

BACKGROUND

Various compression schemes today enable compression and decompression of network packet headers. Many such schemes are optimized for packet transfers over wired, bandwidth-restricted networks, such as telephone networks (via modem connections). These schemes generally do not take into account specific peculiarities of wireless networks, such as higher error rate tolerance to ensure successful packet transfers. High error rates may, however, significantly degrade the performance of traditional header compression schemes.

To specifically address the characteristics of wireless networks, the Internet Engineering Task Force ("IETF") recently developed a header compression standard compatible with wireless networks. Known as Robust Header Compression ("ROHC," IETF RFC 3095, July 2001), the standard focuses on compressing packet headers for a variety of network packets on wireless networks. Thus far, "profiles" have been defined for applying ROHC to Internet Protocol ("IP") packets, Real-Time Protocol ("RTP") packets, User Datagram Protocol ("UDP") packets and Transport Control Protocol ("TCP") packets. Profiles are schemes or protocols that define how compression is performed on various network packets.

Similar to other compression schemes, ROHC is generally applied "hop-by-hop," namely at every node on the network. In other words, when a node receives a compressed packet header, it decompresses the packet header, examines the header fields, and recompresses the packet header for transfer to the next node on the network. These steps may be performed at every node on the network in between the source node (where the packets originate) and the destination node (the ultimate destination for the packets).

In addition to compression, security protocols are also commonly applied to network packets. Internet Protocol Security ("IPSec," IETF RFC 2401, November 1998) is a set of security protocols developed by the IETF to provide security services at the IP layer of a network. IPSec provides two protocols for security, namely the IP Authentication Header ("AH") protocol and the Encapsulating Security Payload ("ESP") protocol. AH may provide connectionless integrity, data origin authentication and optional anti-replay services while ESP may provide encryption, limited traffic flow confidentiality, connectionless integrity, data origin authentication and anti-replay services.

IPSec-protected IP packets may be transmitted in either "transport mode" and/or "tunnel mode." Transport mode transmission may be used for secure transmission of an IP packet from a source node directly to its ultimate destination node, without any intermediate security devices, e.g. between two peer nodes. Tunnel mode, on the other hand, is typically used when the packet from a source node has to traverse through additional security devices such as security gateways (including one or more routers, firewalls and/or other network devices) prior to arriving at the destination node. Tunnel mode may also be used to hide the flow details of the packet because only the tunnel entry and exit points are visible to anyone who may intercept the packet.

In contrast to ROHC, IPSec is not applied hop-by-hop, but rather "end-to-end." In other words, an IPSec protected packet is generally encoded on the source node and decoded on the destination node (or on the security gateway, in tunnel mode). The IETF mandates the use of IPSec for all networks conforming to IPv6 (IETF RFC 1883, December 1995) and MobileIPv6 (IETF MobileIPv6, Internet Draft draft-ietf-mobileip-ipv6-19.txt. (Work In Progress), September 2002) standards, and recommends the use of IPSec for all networks conforming to the IPv4 (IETF RFC 2401, November 1998) and MobilIPv4 (IETF RFC 3220, January 2002) standards. As a result, IP packets transmitted over any network today are most likely protected by IPSec protocols.

Unfortunately, there are no IETF profiles for applying ROHC to IPSec protected packets today. In other words, IPSec-protected IP packets may not currently be compressed. This inability to compress IPSec-protected IP packets is becoming increasingly problematic. IP packet headers have increased in size as new IP protocols have been introduced. For example, the IPv6 standard increased IP packet header sizes by almost fifty percent. Additionally, the introduction of the "v4-v6 tunneling" concept to ensure compatibility between IPv4 and IPv6 compliant networks has added significant overhead to IP packet headers. Mobile IP protocols have also introduced additional IP packet headers, thus contributing to the inflation of IP packet size.

As a result, there is a need to be able to compress IP packets, and more specifically IPSec-protected IP packets. The IETF has recently discussed the possibility of using a compression scheme called "IPComp" to enable header compression of IPSec-protected IP packets. IPComp, however, suffers from a number of shortcomings. Most importantly, IPComp is a general-purpose compression scheme, designed for data compression. As a result, IPComp provides only limited compression gains for packet header compression, as compared to ROHC, which is optimized for packet header compression and may achieve between eighty and/or ninety percent compression efficiency. This difference in compression efficiency also results partially from the inherent characteristics of these two compression schemes. IPComp is a "stateless" scheme, i.e., it compresses and decompresses each IP packet by itself, without any relation to other packets. In contrast, ROHC is a "stateful" compression scheme, which is more complex because it retains additional information regarding each IP packet, but may also achieve a higher degree of compression.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention apply robust header compression to encrypted network packets. For the purposes of this specification, references to robust header compression" include ROHC or other similar hop-by-hop compression schemes, and references to IPSec include IPSec, other network protocols having characteristics similar to IPSec, e.g., other network security protocols and/or other end-to-end network protocols. Additionally, reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Figure 1:
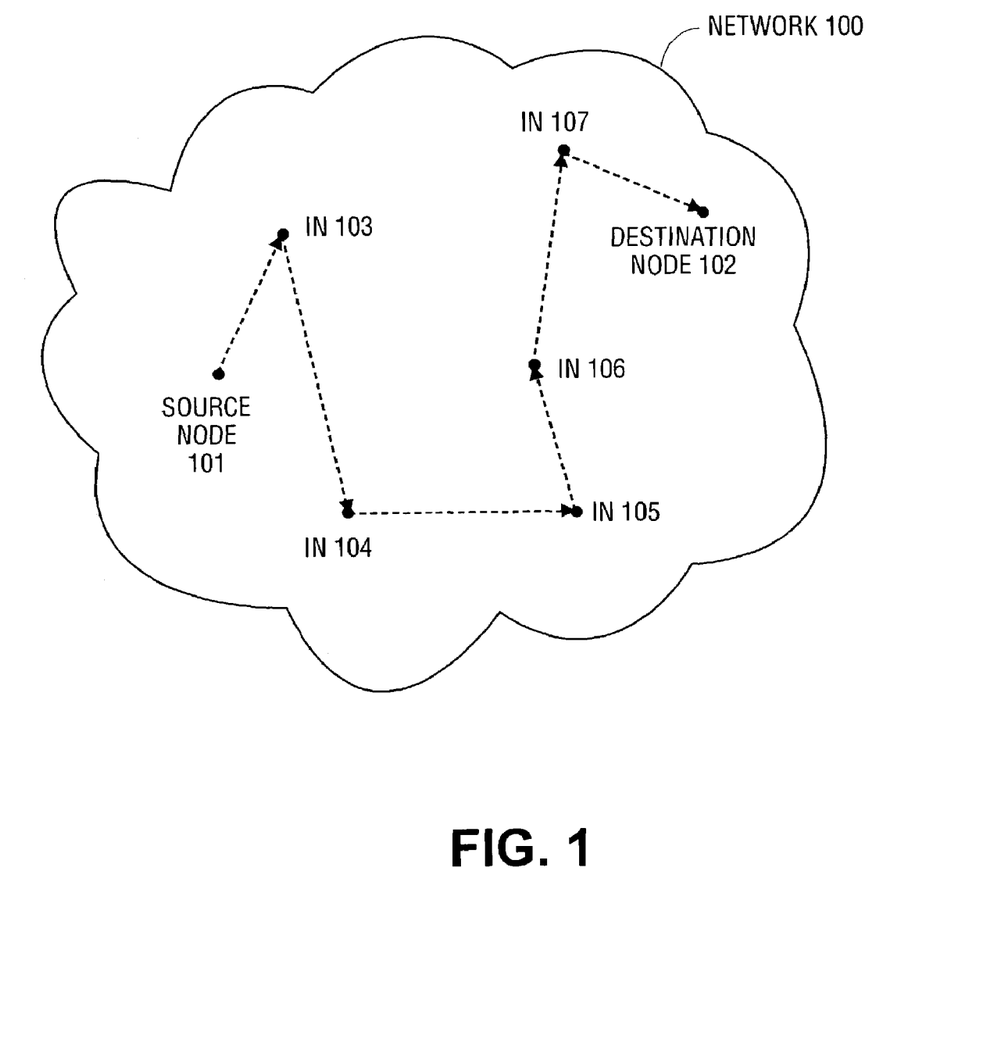
FIG. 1 illustrates a known method of transmitting an IP packet over a network.

FIG. 1 illustrates a known method of transmitting an IP packet over a network ("Network 100"). As illustrated, the IP packet may originate at Source Node 101 and be transmitted over Network 100 to Destination Node 102. The IP packet is unlikely, however, to go directly from Source Node 101 to Destination Node 102. Instead, in a typical network such as Network 100, the IP packet is likely to be routed via one or more intermediate nodes, illustrated in FIG. 1 as IN 103, IN 104, IN 105, IN 106 and IN 107.

Figure 2:
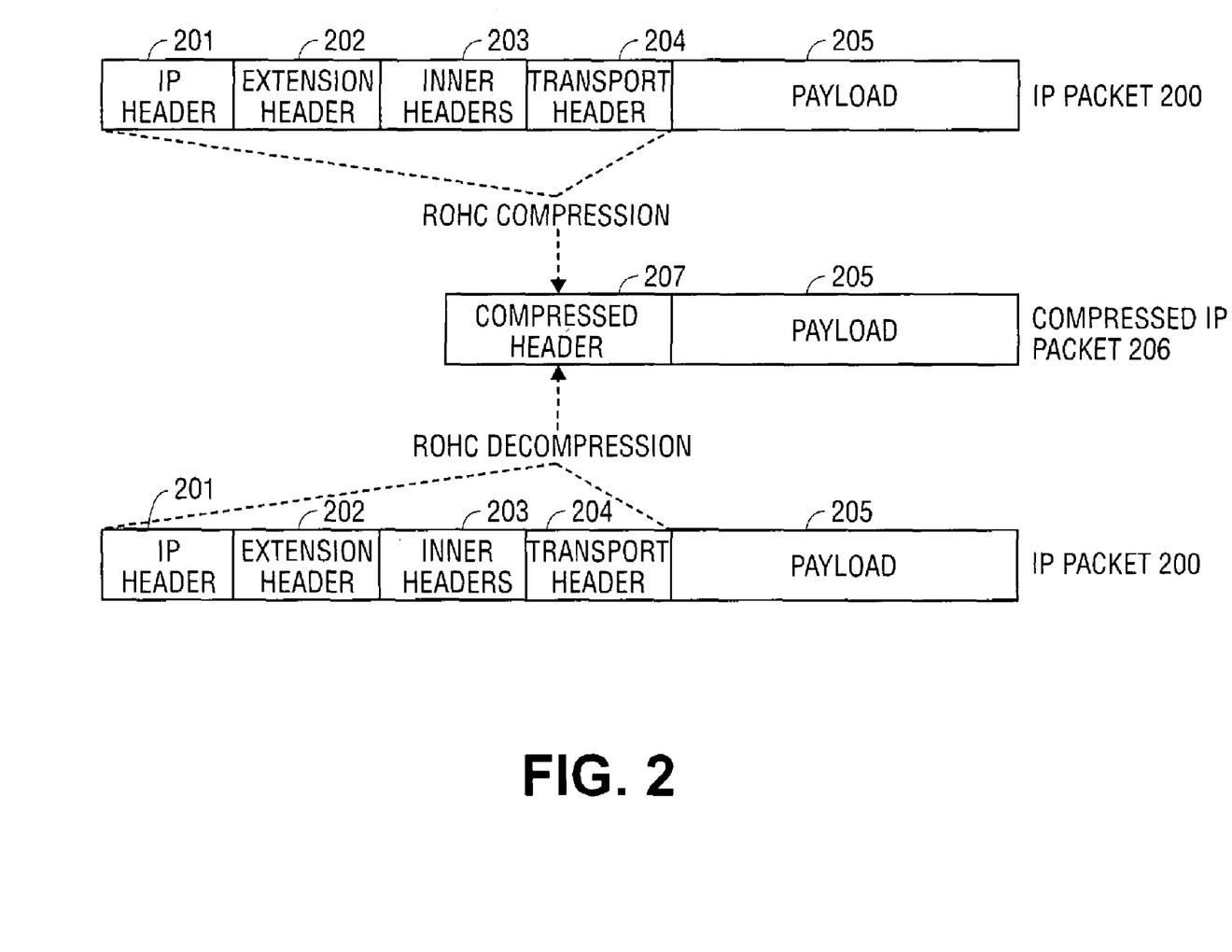
FIG. 2 is a packet flow diagram illustrating a known method of applying ROHC to an IP packet.

FIG. 2 is a packet flow diagram illustrating a known method of applying ROHC, without encryption, to an IP packet ("IP Packet 200") transmitted over Network 100 from Source Node 101 to Destination Node 102. ROHC relies on a number of inherent characteristics of IP packets to achieve its compression gains. Most importantly, IP packet headers for a particular IP session generally include information that is redundant and/or highly predictable in each packet. For example, within a particular IP session, the source and destination node information for a packet remains static (i.e., regardless of the new data that may be transmitted in each packet, the packets always originate at the source node and end at the destination node for the duration of a session). Thus, each IP packet transmitted over the network for the duration of that IP session repeats the same information source and destination information in its header fields. As will be readily apparent to those of ordinary skill in the art, various other types of session information in the packet headers (e.g., port addresses and session IDs) may also be redundant and/or highly predictable.

Amongst other things, ROHC provides a methodology by which the redundant and/or highly predictable header field information may be replaced with context IDs. Thereafter, instead of having to transmit the redundant and/or highly predictable header information with each IP packet in a session, the context IDs for the headers may be transmitted instead. This results in a significantly smaller or "compressed" packet. Upon receipt at the destination node, the node may decompress the packet by looking up the context IDs in a table that maps the context IDs with the original information. The destination node may thereby restore the original packet. Transmitting context IDs instead of repeatedly transmitting redundant and/or highly predictable information enables ROHC to achieve significant header compression gains.

As illustrated in FIG. 2, in one embodiment, IP Packet 200 may comprise the following header fields: IP Header 201, Extension Headers 202, Inner Headers 203, Transport Header 204 and Payload 205. It will be readily apparent to those of ordinary skill in the art that IP Header 201, Extension Header 202, Inner Headers 203 and Transport Header 204 represent typical header fields in an IP packet, and that application of ROHC is not limited only to such fields. IP Header 201 includes information pertaining to the source node and the destination node of IP Packet 200. Extension Header 202 includes headers such as MobileIP v4 and/or v6 headers. Inner Headers 203 includes optional inner IP headers and other optional extension headers. Transport Header 204 includes TCP, UDP, RTP, Stream Control Transmission Protocol ("SCTP") and/or other transport protocol headers (understood only by the destination). Payload 205 comprises the data being transmitted from Source Node 110 to Destination Node 102.

At Source Node 101, ROHC may be applied to IP Packet 200's header fields, in this case IP Header 201, Extension Headers 202, Inner Header 203 and Transport Header 204. As illustrated, this results in Compressed IP Packet 206 comprising Compressed Header 207 and Payload 205. Compressed IP Packet 206 may be transmitted from Source Node 101 to IN 103. IN 103 receives Compressed IP Packet 206, decompresses Compressed Header 207 and examines the decompressed header fields. Once IN 103 determines the destination of IP Packet 200, it may then recompress IP Header 201, Extension Headers 202, Inner Header 203 and Transport Header 204 into Compressed IP Packet 206 and transmit Compressed IP Packet 206 to the next intermediate node on the network, namely IN 104. The above process is repeated at IN 104 and other intermediate nodes (IN 105, IN 106 and IN 107) until IP Packet 200 is received at Destination Node 102.

Figure 3:
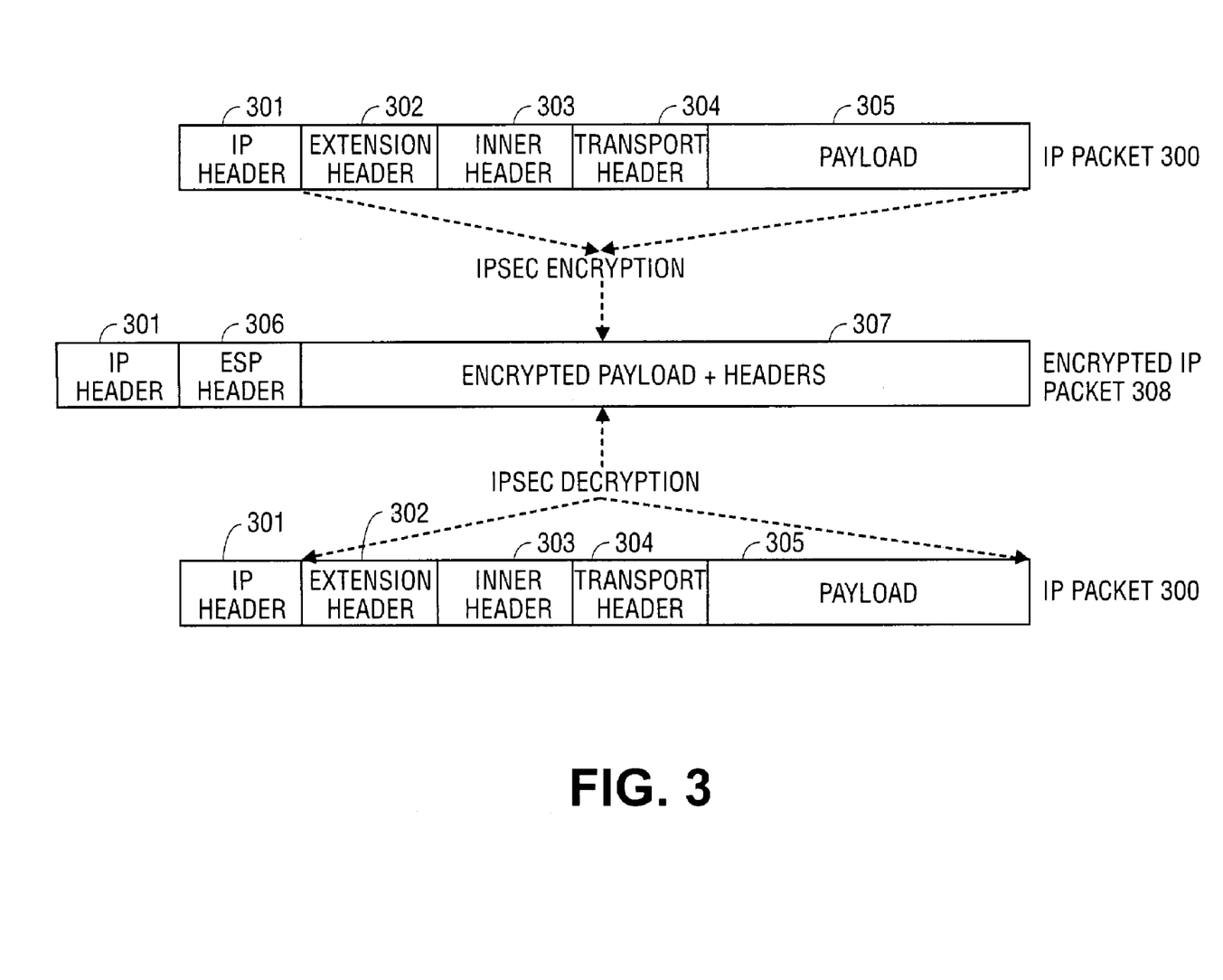
FIG. 3 is a packet flow diagram illustrating a known method of applying IPSec to an IP packet.

FIG. 3 is a packet flow diagram illustrating how IPSec may be applied today, without ROHC to an IP packet transmitted over Network 100 from Source Node 101 to Destination Node 102. As illustrated, in one embodiment, IP Packet 300 comprises the following fields: IP Header 301, Extension Headers 302, Inner Headers 303, Transport Header 304 and Payload 305. Once again, it will be readily apparent to those of ordinary skill in the art that IP Header 301, Extension Header 302, Inner Headers 303 and Transport Header 304 represent typical header fields in an IP packet, and that IPSec protocols are not limited only to such fields.

As illustrated in FIG. 3, an IPSec protocol, such as ESP, may be applied to IP Packet 300, to encrypt the packet. This encryption results in an ESP Header ("ESP Header 306") being added to the packet, while Extension Header 302, Inner Headers 303, Transport Header 304 and Payload 305 are all encrypted, resulting in Encrypted Payload+Headers 307. Encrypted Payload+Headers 307, IP Header 301 and ESP Header 306 together comprise Encrypted IP Packet 308, which may then be transmitted from Source Node 101 via intermediate nodes (IN 103, IN 104, IN 105, IN 106 and IN 107) to Destination Node 102. On Destination Node 102, Encrypted IP Packet 308 may be decrypted (which removes ESP Header 306 and decrypts the encrypted portion of the packet), thus restoring IP Packet 300.

Based on FIG. 2 and FIG. 3, it is readily apparent to those of ordinary skill in the art, these two schemes are currently incompatible because encryption effectively prevents ROHC from being able to compress and decompress most of the IP packet headers at each node in between Source Node 101 and Destination Node 102. More specifically, in IPSec-protected IP packets, the header fields are generally encrypted at Source Node 101 and may only be decrypted by Destination Node 102. Since most of the header fields are encrypted, ROHC may not be applied hop-by-hop to the encrypted portions of the packet. Instead, as is readily apparent from the illustration of FIG. 3, ROHC may only be applied to the unencrypted header fields (IP Header 301 and ESP Header 306) which provides only minimal compression gains. There is therefore a need to be able to compress IPSec-protected IP packets in such a manner as to provide increased compression gains.

Embodiments of the present invention describe a scheme by which ROHC may be applied to IPSec-protected IP packets. According to one embodiment of the present invention, ROHC may be applied to portions of an IP packet header prior to encryption, and ROHC may then be optionally applied again to the uncompressed, unencrypted packet headers. The secure, compressed IP packet may then be transmitted from a source node to a destination node via various intermediate nodes. In other words, according to embodiments of the present invention, ROHC may be applied in stages to all headers in IPSec-protected IP packets, thus maximizing compression gains.

Figure 4:
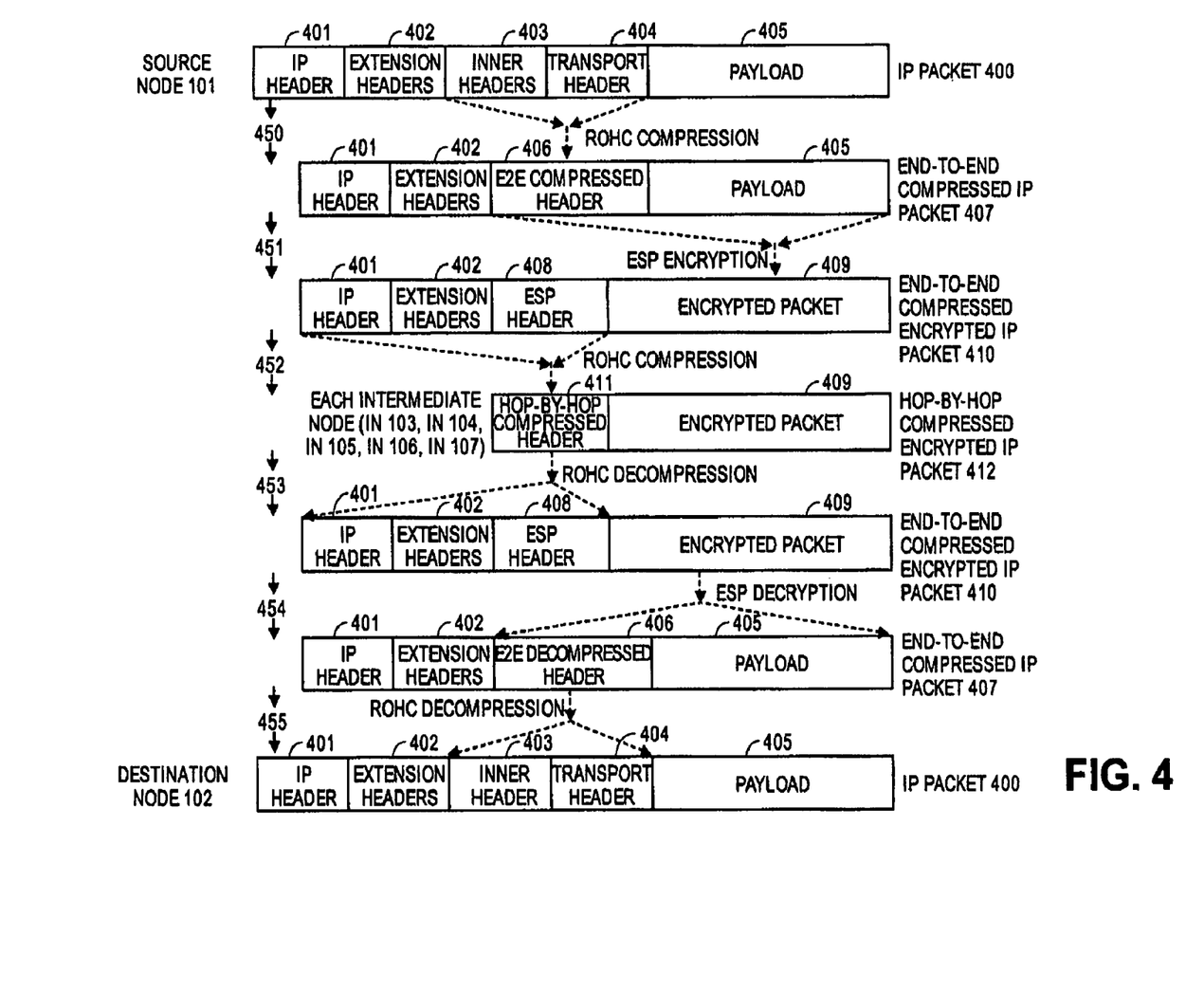
FIG. 4 is a packet flow diagram illustrating one embodiment of the present invention.

FIG. 4 illustrates an embodiment of the present invention in further detail. Once again, IP Packet 400 is transmitted from Source Node 101 to Destination Node 102 via various intermediate nodes (IN 103, IN 104, IN 105, IN 106 and IN 107). According to one embodiment, however, both ROHC and IPSec protocols are applied to the packet prior to transmission. More specifically, IP Packet 400 originally comprises the following fields: IP Header 401, Extension Headers 402, Inner Headers 403, Transport Header 404 and Payload 405. It will be readily apparent to those of ordinary skill in the art that IP Header 401, Extension Header 402, Inner Headers 403 and Transport Header 404 represent typical header fields in an IP packet, and that embodiments of the present invention are not limited only to such fields.

According to one embodiment, in 450, ROHC is applied to Inner Headers 403 and Transport Headers 404, resulting in an end-to-end compressed header field ("e2e Compressed Header 406"). e2e Compressed Header 406 includes information used only by Destination Node 102, i.e., the information is not necessary for the packet to traverse any intermediate nodes between Source Node 101 and Destination Node 102. e2e Compressed Header 406, together with IP Header 401, Extension Headers 403 and Payload 405 constitute End-to-End Compressed IP Packet 407. Subsequently, in 451, End-to-End Compressed IP Packet 407 is encrypted according to an IPSec protocol such as ESP, which adds an ESP header field ("ESP Header 408") to IP Packet 400, and generates encrypted packet ("Encrypted Packet 409") from e2e Compressed Header 406 and Payload 405. The encrypted End-to-End Compressed IP Packet 407 ("End-to-End Compressed Encrypted IP Packet 410") now comprises IP Header 401, Extension Headers 402, ESP Header 408 and Encrypted Packet 409.

Optionally, according to one embodiment of the present invention, ROHC may be applied again, to maximize the compression of IP Packet 400. This application of ROHC may be similar to the process described in accordance with FIG. 2 above. More specifically, in 452, ROHC may be applied to End-to-End Compressed Encrypted IP Packet 410, which results in IP Header 401, Extension Header 402 and ESP Header 408 being compressed into Hop-by-Hop Compressed Header 411. The resulting packet, Hop-by-Hop Compressed Encrypted Packet 412, according to an embodiment of the present invention, leaves unencrypted the packet headers necessary for the packet to be compressed and decompressed at each hop.

Thus, for example, when End-to-End Compressed Encrypted IP Packet 410 is transmitted from Source Node 101 to the first intermediate node, IN 103, IN 103 in 453 may decompress Hop-by-Hop Compressed Header 411 into IP Header 410, Extension Headers 402 and ESP Header 408, determine the destination of Hop-by-Hop Compressed Encrypted IP Packet 412 and then recompress (i.e., apply ROHC to) IP Header 401, Extension Headers 402 and ESP Header 408 again. The resulting Hop-by-Hop Compressed Encrypted IP Packet 412 may then be transmitted from IN 103 to the next intermediate node, IN 104. Upon receipt at IN 104, in 453, Hop-by-Hop Compressed Header 411 may be decompressed into IP Header 401, Extension Header 402 and ESP Header 408. This process essentially restores End-to-End Compressed Encrypted IP Packet 410. This decryption enables IN 104 to determine the next destination for End-to-End Compressed Encrypted IP Packet 410. IN 104 may then repeat 452 to generate Hop-by-Hop Compressed Encrypted IP Packet 412 and transmit the packet to IN 105. This process may continue until Hop-by-Hop Compressed Encrypted IP Packet 412 is received on Destination Node 102.

In the event the above described optional ROHC application is implemented, when the Hop-by-Hop Compressed IP Packet 412 is received on Destination Node 102, it is first decompressed in 453 (as occurs at each intermediate node on the network) to restore End-to-End Compressed Encrypted IP Packet 410. At Destination Node 102, however, in 454, End-to-End Compressed Encrypted IP Packet 410 may then be decrypted, which removes ESP Header 408 and restores Encrypted Packet 409 into e2e Compressed Header 406 and Payload 405. In 455, e2e Compressed Header 406 may then be decompressed, which in turn restores Inner Header 403 and Transport Header 404. In this manner, IP Packet 400 is restored at Destination Node 102.

Embodiments of the present invention may enable ROHC to be optionally applied to entire IP packets. For example, in a scenario where IPv4 IP packets are "tunneled" within IPv6 networks, ROHC may be applied to the entire IPv4 IP packet prior to adding IPv6 headers to the packet. The compressed IPv4 IP packet may therefore appear as the payload in the IP v6 IP packet, and according to embodiments of the present invention, ROHC may be applied again to the IPv6 packet prior to the IP v6 packet being encrypted. In embodiments of the present invention therefore layered (or repeated) application of ROHC to IP packets may significantly increase compression efficiency.

Figure 5:
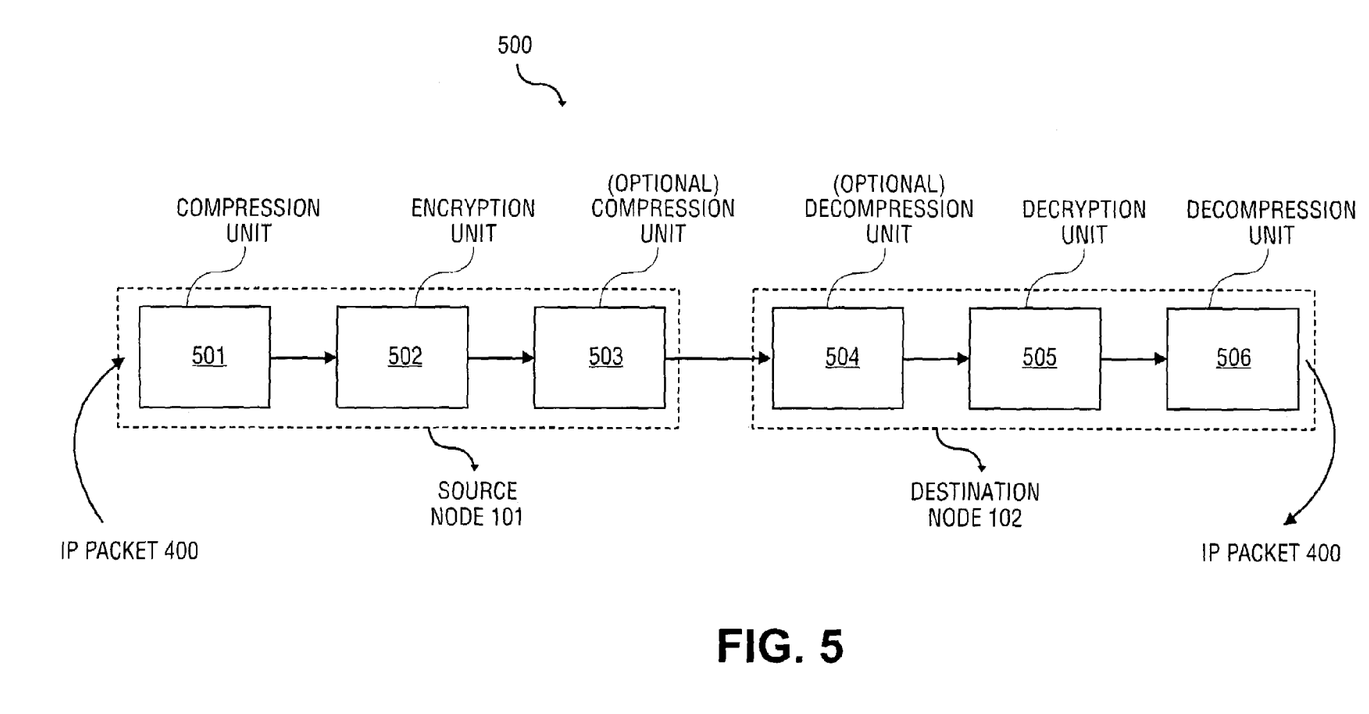
FIG. 5 illustrates a system ("System 500") according to embodiments of the present invention

FIG. 5 illustrates a system ("System 500") according to embodiments of the present invention. It will be readily apparent to those of ordinary skill in the art that various elements of System 500 may be implemented as hardware, software, firmware and/or any combination thereof. As illustrated, System 500 comprises Compression Unit 501, Encryption Unit 502 and Compression Unit 503 at Source Node 101, and Decompression Unit 504, Decryption Unit 505 and Decompression Unit 506 at Destination Node 102. The following description assumes that this system is used to implement the embodiments of the invention described in FIG. 4 above.

According to one embodiment, at Source Node 101, Compression Unit 501 applies ROHC to IP Packet 400's header fields (specifically to Inner Headers 403 and Transport Headers 404), resulting in an end-to-end compressed header field ("e2e Compressed Header 406"). e2e Compressed Header 406, together with IP Header 401, Extension Headers 403 and Payload 405 constitute End-to-End Compressed IP Packet 407. Subsequently, Encryption Unit 502 encrypts End-to-End Compressed IP Packet 407 according to an IPSec protocol such as ESP, which adds an ESP header field ("ESP Header 408") to IP Packet 400, and generates encrypted packet ("Encrypted Packet 409") from e2e Compressed Header 406 and Payload 405. The encrypted End-to-End Compressed IP Packet 407 ("End-to-End Compressed Encrypted IP Packet 410") now comprises IP Header 401, Extension Headers 402, ESP Header 408 and Encrypted Packet 409.

System 500 may optionally include Compression Unit 503. It will be apparent to those of ordinary skill in the art that Compression Unit 503 may be the same unit as Compression Unit 501, or a separate stand-alone unit. In either instance, according to one embodiment of the present invention, Compression Unit 503 may apply ROHC again, this time to End-to-End Compressed Encrypted IP Packet 410, to maximize the compression of IP Packet 400. This application of ROHC results in IP Header 401, Extension Header 402 and ESP Header 408 being compressed into Hop-by-Hop Compressed Header 411. This results in Hop-by-Hop Compressed Encrypted Packet 412.

Hop-by-Hop Compressed IP Packet 412 is transmitted (via various intermediate nodes) to Destination Node 102. Upon receipt, Hop-by-Hop Compressed IP Packet 412 is decompressed by Decompression Unit 504. As will be readily apparent to those of ordinary skill in the art, Decompression Unit 504 only performs this action if the optional compression process is performed by Compression Unit 503 at Source Node 101. This decompression restores End-to-End Compressed Encrypted IP Packet 410. Decryption Unit 505 may then decrypt End-to-End Compressed Encrypted IP Packet 410, thus removing ESP Header 408 and restoring Encrypted Packet 409 into e2e Compressed Header 406 and Payload 405. Decompression Unit 506 may then decompress e2e Compressed Header 406, which in turn restores Inner Header 403 and Transport Header 404. In this manner, IP Packet 400 is restored at Destination Node 102.

Embodiments of the present invention may be implemented on a variety of data processing devices. It will be readily apparent to those of ordinary skill in the art that these data processing devices may include various software, and may comprise devices such as mainframe computers, workstations, personal computers, laptops, portable handheld computers, PDAs and/or cellular telephones.

According to an embodiment of the present invention, the data processing devices is a machine that may include various components capable of executing instructions to accomplish an embodiment of the invention. As used in this specification, a "machine" includes, but is not limited to, any data processing device with one or more processors. The machine may, for example, include and/or be coupled to at least one machine-accessible medium. As used in this specification, a machine-accessible medium includes any mechanism that stores and/or transmits information in any form accessible by a machine, the machine-accessible medium including but not limited to, recordable/non-recordable media (such as read only memory (ROM), random access memory (RAM), magnetic disk storage media, optical storage media and flash memory devices), as well as electrical, optical, acoustical or other form of propagated signals (such as carrier waves, infrared signals and digital signals).

According to an embodiment, a machine and machine-accessible media may be communicatively coupled using a bridge/memory controller, and the machine's processor may be capable of executing instructions stored in the machine-accessible media. The bridge/memory controller may be coupled to a graphics controller, and the graphics controller may control the output of display data on a display device. The bridge/memory controller may be coupled to one or more buses. A host bus host controller such as a Universal Serial Bus ("USB") host controller may be coupled to the bus(es) and a plurality of devices may be coupled to the USB. For example, user input devices such as a keyboard and mouse may be included for providing input data.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of securing and compressing a network packet, comprising:
    applying a first robust header compression scheme to the network packet, the network packet comprising a first packet header, a second packet header and a payload, the first robust header compression scheme being applied to the first packet header to generate an end-to-end compressed packet header, the end-to end compressed packet header, the second packet header and the payload together comprising an end-to-end compressed network packet;
    encrypting the end-to-end compressed network packet, by adding an encryption header to the end-to-end compressed network packet to generate an encrypted end-to-end compressed network packet, the encrypted end-to-end compressed network packet comprising the encryption header, the end-to-end compressed packet header, the second packet header and the payload; and
    applying a second robust header compression scheme to the encryption header, the end-to-end compressed packet header and the second packet header in the encrypted end-to-end compressed network packet to generate a hop-by-hop compressed network packet.

2. The method according to claim 1 wherein the first robust header compression scheme and the second robust header compression scheme are Robust Header Compression.

3. The method according to claim 1 wherein encrypting the end-to-end compressed network packet by adding the encryption header to the end-to-end compressed network packet includes applying an IP security protocol header to the compressed network packet.

4. A method of decompressing a compressed and encrypted network packet, the network packet including an encrypted end-to-end compressed network packet, the method comprising:
    receiving the encrypted end-to-end compressed network packet including an encryption header, an end-to-end compressed packet header, a second packet header and a payload wherein the encryption header, the end-to-end compressed packet header and the payload are included in a hop-by-hop compressed network packet;
    decrypting the encrypted end-to-end compressed network packet to remove the encryption header and restore the end-to-end compressed packet header, the second packet header and the payload; and
    applying a first robust header decompression scheme to the end-to-end compressed packet header to restore a first packet header.

5. The method according to claim 4 further comprising applying a second robust header decompression scheme to the hop-by-hop compressed network packet to decompress the hop-by-hop compressed network packet and restore the second packet header.

6. The method according to claim 5 wherein the first robust header decompression scheme and the second robust header decompression scheme are Robust Header Compression.

7. An apparatus for securing and compressing a network packet, comprising:
a robust header compression unit capable of applying a first robust header compression scheme to the network packet, the network packet comprising a first packet header, a second packet header and a payload, the first robust header compression scheme being applied to the first packet header to generate an end-to-end compressed packet header, the end-to end compressed packet header, the second packet header and the payload together comprising an end-to-end compressed network packet;
an encryption unit capable of adding an encryption header to the end-to-end compressed network packet to generate an encrypted end-to-end compressed network packet, the encrypted compressed network packet comprising the encryption header, the end-to-end compressed packet header, the second packet header and the payload; and
a second robust header compression unit capable of compressing the encryption header, the end-to-end compressed packet header and the second packet header in the encrypted end-to-end compressed network packet to generate a hop-by-hop compressed network packet.

8. The apparatus according to claim 7 wherein the first robust header compression scheme and the second robust header compression scheme are Robust Header Compression.

9. The apparatus according to claim 7 wherein the encryption unit is capable of adding the encryption header to the compressed network packet by applying an IP security protocol header to the compressed network packet.

10. An apparatus for decompressing a compressed and encrypted network packet, the network packet including an encrypted end-to-end compressed network packet, the apparatus comprising:
a decryption unit capable of decrypting the encrypted end-to-end compressed network packet including an encryption header, an end-to-end compressed packet header, a second packet header and a payload by removing the encryption header and restoring the end-to-end compressed packet header, the second packet header and the payload wherein the encryption header, the end-to-end compressed packet header and the payload are included in a hop-by-hop compressed network packet; and
a robust header decompression unit capable of applying a first robust header decompression scheme to the end-to-end compressed packet header to restore a first packet header;
a second robust header decompression unit capable of decompressing the hop-by-hop compressed network packet to restore the second packet header.

11. The apparatus according to claim 10 wherein the first robust header decompression scheme and the second robust header decompression scheme are Robust Header Compression.

12. An article comprising a machine-accessible medium having stored thereon instructions that, when executed by a machine, cause the machine to:
apply a first robust header compression scheme to the network packet, the network packet comprising a first packet header, a second packet header and a payload, the first robust header compression scheme being applied to the first packet header to generate an end-to-end compressed packet header, the end-to end compressed packet header, the second packet header and the payload together comprising an end-to-end compressed network packet;
encrypt the end-to-end compressed network packet, by adding an encryption header to the end-to-end compressed network packet to generate an encrypted end-to-end compressed network packet, the encrypted end-to-end compressed network packet comprising the encryption header, the end-to-end compressed packet header, the second packet header and the payload; and
apply a second robust header compression scheme to the encryption header, the end-to-end compressed packet header and the second packet header in the encrypted end-to-end compressed network packet to generate a hop-by-hop compressed network packet.

13. The article according to claim 12 wherein the first robust header compression scheme and the second robust header compression scheme are Robust Header Compression.

14. The article according to claim 12 wherein the instructions that cause the machine to encrypt the end-to-end compressed network packet by adding the encryption header to the end-to-end compressed network packet includes applying an IP security protocol header to the compressed network packet.

15. An article comprising a machine-accessible medium having stored thereon instructions that, when executed by a machine, cause the machine to:
decompress a compressed and encrypted network packet, the network packet including an encrypted end-to-end compressed network packet, the method comprising:
receive the encrypted end-to-end compressed network packet including an encryption header, an end-to-end compressed packet header, a second packet header and a payload wherein the encryption header, the end-to-end compressed packet header and the payload are included in a hop-by-hop compressed network packet;
decrypt the encrypted end-to-end compressed network packet to remove the encryption header and restore the end-to-end compressed packet header, the second packet header and the payload; and
applying a first robust header decompression scheme to the end-to-end compressed packet header to restore a first packet header.

16. The article according to claim 15 wherein the instructions further cause the machine to apply a second robust header decompression scheme to the hop-by-hop compressed network packet to decompress the hop-by-hop compressed network packet and restore the second packet header.

17. The article according to claim 16 wherein the first robust header decompression scheme and the second robust header decompression scheme are Robust Header Compression.

18. A system for transmitting a network packet, comprising:
a network;

a source node on the network, the source node capable of applying a first robust header compression scheme to the network packet, the network packet comprising a first packet header, a second packet header and a payload, the first robust header compression scheme being applied to the first packet header to generate an end-to-end compressed packet header, the end-to end compressed packet header, the second packet header and the payload together comprising an end-to-end compressed network packet, the source node further capable of applying a second robust header compression scheme to the encryption header, the end-to-end compressed packet header and the second packet header in the encrypted end-to-end compressed network packet to generate a hop-by-hop compressed network packet, the source node also capable of encrypting the end-to-end compressed network packet by adding an encryption header to the end-to-end compressed network packet to generate an encrypted end-to-end compressed network packet, the encrypted end-to-end compressed network packet comprising the encryption header, the end-to-end compressed network packet header, the second packet header and the payload, the source node further capable of transmitting the encrypted end-to-end compressed network packet over the network; and a destination node on the network, the destination node capable of receiving the encrypted end-to-end compressed network packet from the source node via the network, the destination node also capable of decrypting the encrypted end-to-end compressed network packet to remove the encryption header and restore the end-to-end compressed packet header, the second packet header and the payload, the source node further capable of applying a first robust header decompression scheme to the end-to-end compressed packet header to restore the first packet header, the destination node is further capable of applying a second robust header decompression scheme to the hop-by-hop compressed packet header to decompress the hop-by-hop compressed header and restore the second packet header.

19. The system according to claim 18 wherein the first robust header compression scheme and the first robust header decompression scheme are Robust Header Compression.

20. A method of routing an encrypted end-to-end compressed network packet, comprising:

receiving the encrypted end-to-end compressed network packet from a first network node, the encrypted compressed network packet including a compressed hop-by-hop packet header;

applying a robust header decompression scheme to the compressed hop-by-hop hop packet header to restore a packet header;

applying a robust header compression scheme to the packet header to regenerate a secure end-to-end compressed network packet including the compressed hop-by-hop packet header; and transmitting the secure end-to-end compressed network packet to a second network node.

21. The method according to claim 20 wherein the encrypted end-to-end compressed network packet is being transmitted from a source node to a destination node and the first node and the second node are intermediate nodes between the source node and the destination node.

22. The method according to claim 20 wherein the robust header compression scheme and the robust header decompression scheme are Robust Header Compression.

* * * * *